United States Patent [19]

Tada et al.

[11] Patent Number: 4,893,243
[45] Date of Patent: Jan. 9, 1990

[54] CONTROL DEVICE FOR MAINTAINING CONSTANT SPEED OF AN AUTOMOBILE

[75] Inventors: Tetsuya Tada, Anjyo; Hiroaki Tabuchi, Toyota; Tatsuo Teratani, Aichi, all of Japan

[73] Assignee: Toyota Jidosha Kabushiki Kaisha, Toyota, Japan

[21] Appl. No.: 149,074

[22] Filed: Jan. 27, 1988

[30] Foreign Application Priority Data

Jan. 28, 1987 [JP] Japan .................. 62-015925

[51] Int. Cl.⁴ .............................................. B60K 31/00
[52] U.S. Cl. ........................... 364/426.04; 364/431.07; 180/179; 123/352
[58] Field of Search ...................... 364/431.07, 426.01, 364/426.04; 123/350, 352; 180/178, 179, 177

[56] References Cited

U.S. PATENT DOCUMENTS

| | | | |
|---|---|---|---|
| 4,419,729 | 12/1983 | Krieder | 364/426.04 |
| 4,467,428 | 8/1984 | Caldwell | 364/426.04 |
| 4,479,184 | 10/1984 | Nakano | 364/426.04 |
| 4,484,279 | 11/1984 | Muto | 364/426.04 |
| 4,535,864 | 8/1985 | Tanigawa et al. | 180/177 |
| 4,535,865 | 8/1985 | Tanigawa et al. | 180/179 |
| 4,569,239 | 2/1986 | Shirley et al. | 180/179 |
| 4,591,986 | 5/1986 | Nakajima et al. | 364/426.04 |
| 4,598,370 | 7/1986 | Nakajima et al. | 364/426.04 |
| 4,725,969 | 2/1988 | Onogi et al. | 364/426.04 |

Primary Examiner—Parshotam S. Lall
Assistant Examiner—V. N. Trans
Attorney, Agent, or Firm—Cushman, Darby & Cushman

[57] ABSTRACT

A control device for maintaining a constant speed of an automobile, having an internal combustion engine with a throttle valve and an actuator for the throttle valve. A degree of opening of the throttle valve is decided to bring the speed of the automobile to a desired set speed, corrected in accordance with running conditions by cyclically repeating an integral calculation at a first pattern to provide an integral correction value when a difference exists between the detected speed and the set speed. This integral correcting value is quickly returned at a second pattern greater than the first pattern when the integral correction value becomes greater than a predetermined value and the relationship between the detected speed and the set speed is reversed.

13 Claims, 10 Drawing Sheets

CONTROL DEVICE FOR MAINTAINING CONSTANT SPEED OF AN AUTOMOBILE

BACKGROUND OF THE INVENTION

1. Field of the Invention

The present invention relates to a control device for maintaining a constant speed of an automobile having an internal combustion engine.

2. Description of the Related Art

The speed of an automobile is generally controlled by operating an accelerator pedal mechanically connected to a throttle valve arranged in the internal combustion engine of the automobile. Therefore, it is obviously possible to control the speed of the automobile by actuating the throttle valve by a means other than the accelerator pedal. Recently, an automobile autocruising device has been developed which allows a driver to automatically drive the automobile, while releasing the foot from the accelerator pedal, by the provision of an actuator for the throttle valve, and which fundamentally includes a control device for maintaining a constant speed of the automobile.

The speed of the automobile has a linear relationship to a degree of opening of the throttle valve, as shown, for example, in FIG. 7 of the attached drawings, while the automobile is running on an even road. Therefore, it is possible to decide a degree of opening of the throttle valve $ST_O$ according to a desired set speed SPM, if given, and thus it is possible to cause the automobile to cruise constantly at the desired set speed SPM by constantly maintaining that degree of opening of the throttle valve $ST_O$.

However, when the automobile is running on a slope or travelling uphill, as shown, for example, in FIG. 8 of the attached drawings, the speed of the automobile may be lowered if the degree of opening of the throttle valve is maintained at a constant value. Therefore, it is necessary to increase the degree of opening of the throttle valve to a value $ST_1$, as shown in FIG. 7, in order to maintain a constant speed of the automobile. However, it is impossible to memorize all roads and other running conditions of the automobile, and thus it becomes necessary to regulate the degree of opening of the throttle valve while the automobile is running.

Accordingly, it becomes necessary to correct the degree of opening of the throttle valve in accordance with actual running conditions, to enable the automobile to cruise at a constant speed. For this purpose, an integral correction calculation is conventionally used, which comprises a calculation of an integral correction value to correct the degree of opening of the throttle valve when there is a difference between the actual speed and the desired set speed, by cyclically repeating an integral calculation in a predetermined pattern. For example, the following calculation is repeatedly carried out.

TON=TON+CG(SPM−SPD)

where,
TON=integral correction value of a degree of opening of the throttle valve
SPM=set speed
SPD=actual speed
CG=correction gain This calculation is cyclically repeated according to a computer operating cycle (for example, every 50 ms) to integrate or accumulate a value CG(SPM - SPD) which corresponds to the deviation in the speed of the automobile.

It will be appreciated that, when the automobile is running on a long upward slope, as shown in (A) of FIG. 8, the actual speed SPD becomes lower than the set speed SPM, as shown in (C) of FIG. 8, so that a value corresponding to the speed deviation CG((SPM−SPD) is integrated many times in sequence while the actual speed SPD is lower than the set speed SPM, and the integral correction value TON continues to increase, as shown in FIG. (B) of FIG. 8.

When the automobile reaches the top of the slope after the long uphill run, the road then may be flat or run downhill. In this situation, the integral correction value TON, and accordingly, the degree of the opening of the throttle valve, will become a greater value and thus the speed of the automobile will be allowed to increase. Therefore, it is necessary to change the integral correction value TON and the degree of the opening of the throttle valve. Also, in this case, since the above formula TON=TON+CG(SPM−SPD) has been used, and the deviation CG((SPM−SPD) has become a negative value, the integral correction value TON is reduced to a smaller value.

In this integral correction calculation, the correction gain CG cannot be made a relatively large value, to avoid an excess control or undesirable variations on a flat road, and in practice a very small value is used. Accordingly, the rate of change of the integral correction value TON is very small, so that an undershoot in the speed of the automobile at the initial stage of entering the uphill road and an overshoot on the change from the uphill run to the downhill run will occur, as shown in (C) of FIG. 8. This problem can be solved to a great extent by shortening the computer operating cycle to shorten the control response time in accordance with the running conditions, even if the correction gain CG is very small. However, a serious problem still remains when the automobile has run on a very long upward slope and the integral correction value TON has become a very large value because of repeated increases in the calculation over a long period, even if the correction gain CG is very small. In many cases, the integral correction value TON must be made zero or even a minus value immediately after the automobile reaches the top of the hill or passes across the top of the hill to the downhill run, but a considerable time is needed to return the highly integrated correction value TON to a lower value, as above stated, caused by the long uphill ascending time, since the calculation is carried out in the same manner throughout the running of the automobile.

Japanese Patent Application Nos. 60-298132 and 60-294227, filed jointly by the assignee for the present case and a Japanese corporation, disclose a control device for maintaining a constant speed of an automobile by using a vacuum operated actuator which is operated under a duty control. This control device also uses an integral correction calculation, similar to the above described device, but more particularly, comprises a first integral correction element providing a quick response to a change in running conditions and a second integral correction element provided a relatively lower response to such a change. These elements are appropriately combined or selectively used to increase the response at the start of an upward slope and downward slope, or on an undulating road, and to decrease the variation in the speed on a flat road.

SUMMARY OF THE INVENTION

An object of the present invention is to provide a control device for maintaining a constant speed of an automobile, which device uses a calculation of an integral correction value but nevertheless can solve the above described problem.

According to the present invention, there is provided a control device for maintaining a constant speed of an automobile, the automobile having an internal combustion engine with an intake air passage and a throttle valve arranged therein, and the control device comprising: an actuator connected to the throttle valve; means for setting a desired set speed of the automobile; means for detecting a speed of the automobile; throttle deciding means for deciding a degree of opening of the throttle valve and control the actuator to bring the speed of the automobile to the set speed; a first calculating means for correcting the degree of opening of the throttle valve decided by the throttle deciding means when there is a difference between the detected speed and the set speed, by cyclically repeating an integral calculation in a predetermined first pattern to provide an integral correction value; and a second calculating means for returning the integral correction value in a predetermined second pattern greater than the predetermined first pattern when the integral correction value calculated by the first calculating means becomes greater than a predetermined value and the relationship between the detected and set speeds is reversed.

BRIEF DESCRIPTION OF THE DRAWINGS

The present invention will become more apparent from the following description of the preferred embodiment with reference to the accompanying drawings, in which.

DESCRIPTION OF THE PREFERRED EMBODIMENTS

Figure 1:
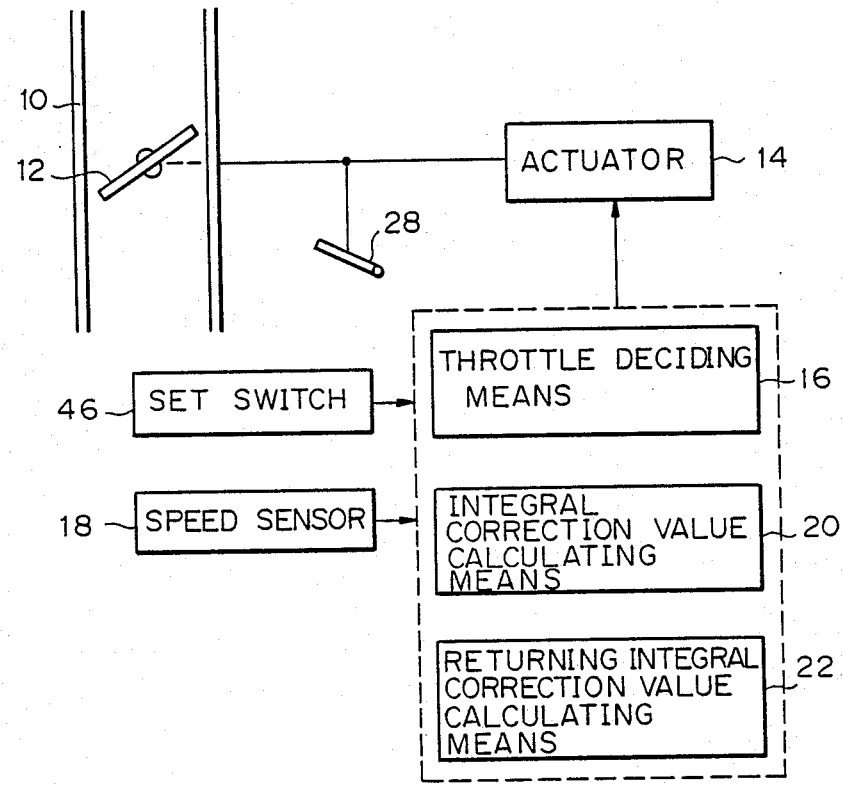
FIG. 1 is a diagrammatic view of a general arrangement of a control device for maintaining a constant speed of an automobile, according to the present invention.

Referring to FIG. 1, an automobile (not shown) is provided with an internal combustion engine (not shown) including an intake air passage 10 and a throttle valve 12 arranged therein. The throttle valve 12 is connected to an accelerator pedal 28 to control the speed of the automobile. The control device according to the present invention comprises an actuator 14 also connected to the throttle valve 12 to control the speed of the automobile, allowing the driver to release the accelerator pedal 28. The control device further comprises a set switch 46 for manually setting a desired set speed, a speed sensor 18, a throttle deciding means 16 for deciding the degree of opening of the throttle valve 12, a first integral correction value calculating means 20, and a second returning integral correction value calculating means 22. The details of these means will be described hereafter.

Figure 2:
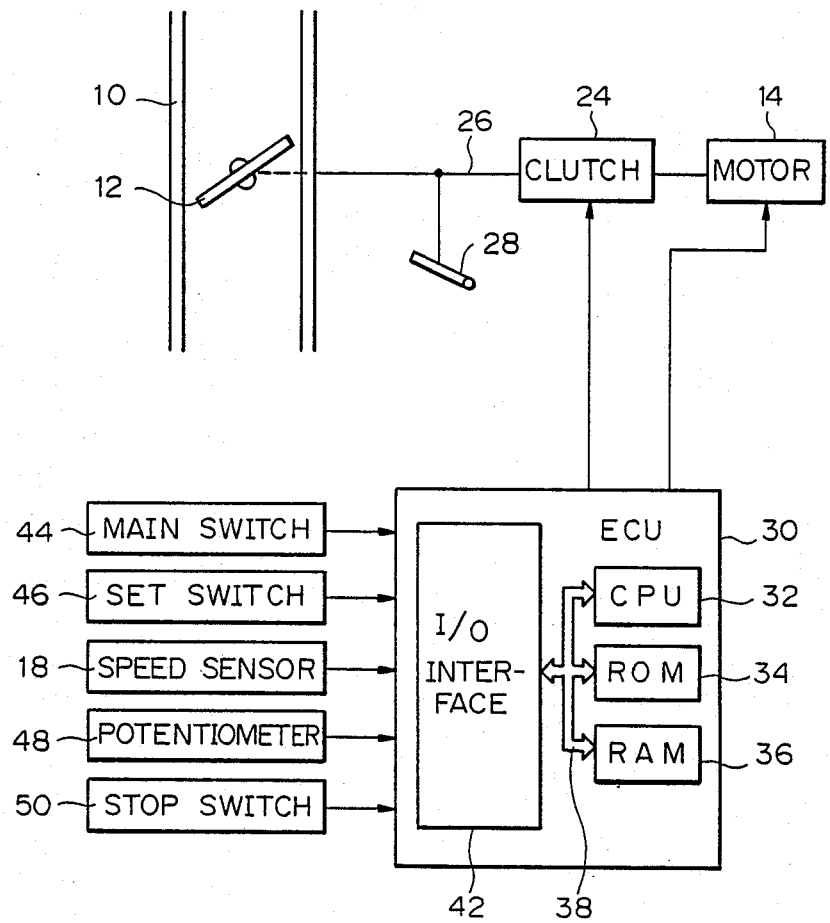
FIG. 2 is a view of a first embodiment of the present invention.

Referring to FIG. 2, in the first embodiment, an electric step motor 14 is used as the actuator of the throttle valve 12. This electric step motor 14 is connected to the throttle valve 12 via a solenoid operated clutch 24 and a cable or linkage 26 to rotationally move the throttle valve 12 to a desired position. The accelerator pedal 28 is also connected to the cable or linkage 26, as above described, so that the throttle valve 12 can be operated selectively by either the accelerator pedal 28 or the electric step motor 14.

An electric control unit (ECU) 30 is provided and includes therein the throttle deciding means 16, the first integral correction value calculating means 20, and the second returning integral correction value calculating means 22. The electric control unit (ECU) 30 is fundamentally constructed by a microcomputer system, comprising a central processing unit (CPU) 32 having arithmetic and control functions, a read only memory (ROM) 34 having a program stored therein, and a random access memory (RAM) 35 for temporarily storing data or the like, and a bus 38 interconnecting these elements. The electric control unit (ECU) 30 receives detection signals from sensors via an input and output (I/0) interface 42 and deliver control signals to the electric step motor 14 and the solenoid operated clutch 24 after a calculation of these signals in accordance with the program stored in the read only memory (ROM) 34.

As will be understood, the control device according to the present invention is a portion of an autocruising device of the automobile, which is provided with several switches to enable an autocruising mode. Some of those switches, at least enough to understand the present invention, are shown in FIG. 2. A main switch 44 connects the autocruising device to an electric power supply source when the driver wishes to enter the autocruising mode. A set switch 46 is pushed when the speed of the automobile reaches a desired set speed, the desired set speed is then stored, and the automobile commences to cruise at that speed. A speed sensor 18 detects he speed of the automobile, and potentiometer 48 is mounted on the shaft of the throttle valve 12 to detect a position or a degree of opening of the throttle valve 12. A stop switch 50 is connected to a stop lamp in the braking system of the automobile to detect an operation of the brake pedal, and then output a signal to cancel the autocruising mode. It will be understood that cruise control switches other than th set switch 46, such as "resume" and "accel" switches, and cancel switches other than the stop switch 50, such as "parking", "neutral" and "clutch" switches, are also provided.

Figure 3:
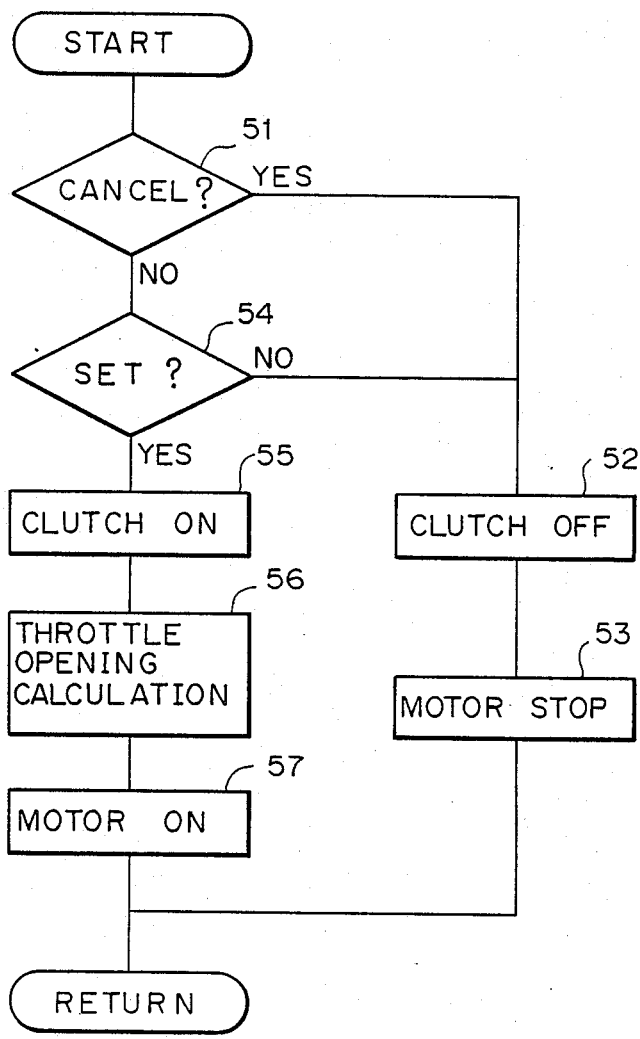
FIG. 3 is a flow chart for executing the control in the control device of the first embodiment.
Figure 7:
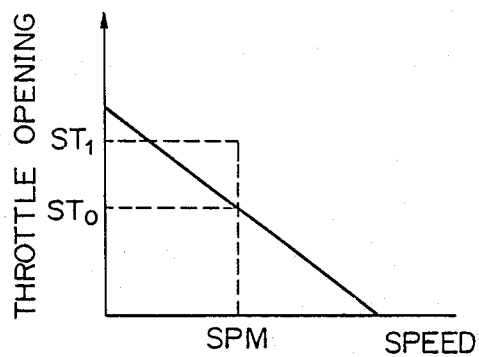
FIG. 7 is a diagram of the relationship between the speed of the automobile and the degree of opening of the throttle valve.
Figure 8:
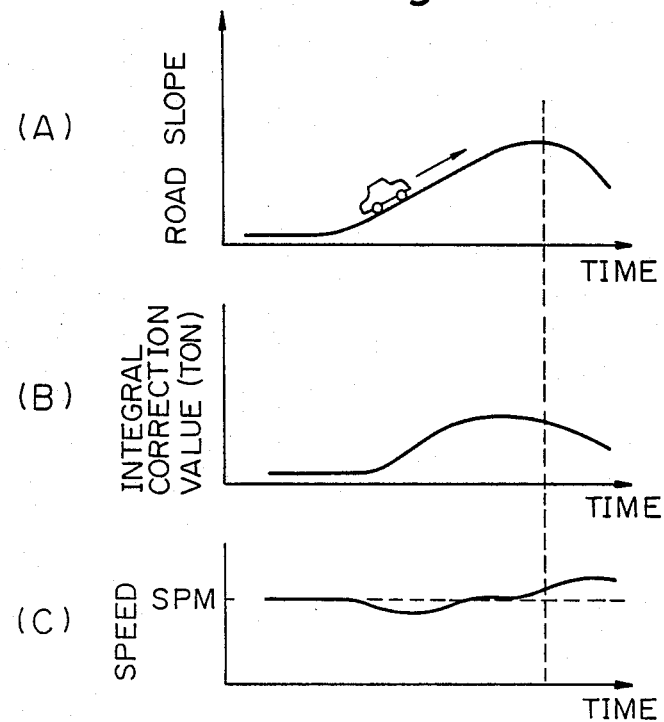
FIG. 8 is a timing chart illustrating the operation and a problem of a control device with a conventional integral correction calculation.

FIG. 3 is a flow chart showing the execution of the control of the autocruising mode, which routine is repeated, for example, every 50 milliseconds. At step 51, it is determined whether or not a cancel signal has been input. If the result is YES, the program goes to steps 52 and 53 to disconnect the solenoid operated clutch 24 and stop the electric step motor 14. The cancel signal is output by the stop switch 50 or the other above described switches, and from the computer itself if an abnormality is detected thereby. If the result at step 51 is NO, the program goes to step 54 to determine whether or not the set switch 46 has been operated. When the set switch 46 has been operated, the speed of the automobile at that moment is stored as a set speed SPM. Further, at that moment, a degree of opening of the throttle valve 12 detected by the potentiometer 48 can be stored as an initial set degree $ST_O$. Alternatively, the initial set degree $ST_O$ can be obtained by calculation using the relationship of FIG. 7, since the set speed SPM has been given. If the result is NO at step 54, the program goes to steps 52 and 53 to disconnect the solenoid operated clutch 24 and stop the electric step motor 14.

If the result at step 54 is YES, the program starts the fundamental autocruise control by connecting the solenoid operated clutch 24 at step 55, calculating the degree of opening of the throttle valve 12 at step 56, and activating the electric step motor 14 according to the calculated result.

Figure 4:
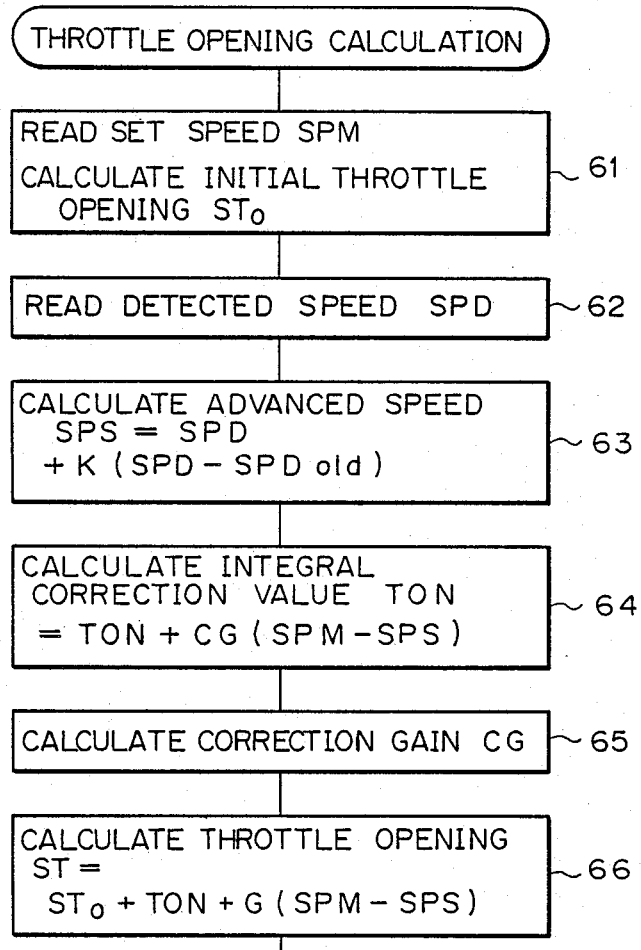
FIG. 4 is a flow chart showing in more detail one of the steps in FIG. 3, for calculating a degree of opening of the throttle valve.

FIG. 4 shows the detail of step 56 in FIG. 3 for calculating a degree of opening of the throttle valve 12 to maintain the speed of the automobile constantly at the set speed SPM, in accordance with the running conditions. At step 61, the set speed SPM and the initial set degree $ST_O$ are read or calculated, and at step 62, the latest speed SPD detected by the speed sensor 18 is read. Then, at step 63, an advanced speed SPS is calculated by $SPS = SPS + K(SPD - SPD_{old})$; the advanced speed SPS representing the predicted speed at a time slightly later than the present time by using the difference between the latest speed SPD and the previously detected speed $SPD_{old}$. This serves to compensate for a delay in the response, from the actuation of the electric step motor 14 and the throttle valve 12 in accordance with the detection of the speed to the resultant change in the speed of the automobile.

Figure 5:
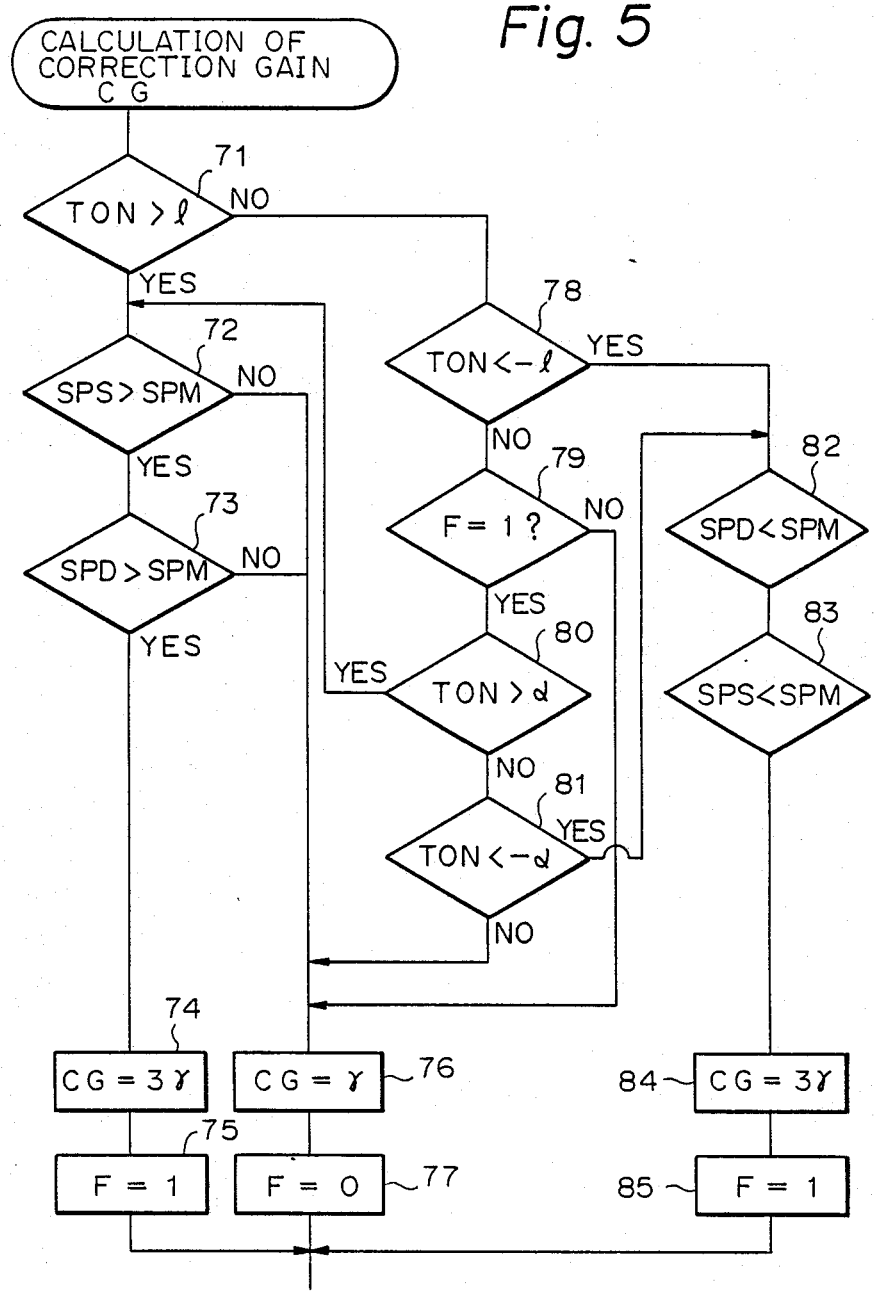
FIG. 5 is a flow chart showing in more detail one of the steps in FIG. 4 for calculating the correction gain.

Then at step 64, an integral correction value TON is calculated by $TON = TON + CG(SPM - SPS)$. As previously described, this calculation is carried out by repeating the integration or accumulation of a deviation value which is a multiplier of a predetermined correction gain CG and the difference between the set speed SPM and the detected (advanced) speed SPS. The integral correction value TON gradually increases when the automobile is running on the upward slope and gradually decreases on the downward slope. As previously described, commonly a constant value is used for the correction gain CG in the case of the upward slope and the downward slope in the conventional device. According to the present invention, the correction gain CG changes in accordance with a preselected condition, as shown at a step 65. The details of step 65 are shown in FIG. 5, for calculating the correction gain CG. Finally at step 66, a degree ST of opening of the throttle valve 12 is decided by the calculation of $ST = ST_O + TON + G(SPM - SPS)$, where G is a control gain, which can be deemed to correspond to the slope of the line in FIG. 7. Assuming that the initial correction value TON is zero, and thus the automobile is running on a flat road, the equation of step 66 is used to effect a feed back control of the throttle opening degree ST around the initial set degree $ST_O$, assuming the initial set degree $ST_O$ to be the center of the control. The addition of the integral correction value TON means that the center of the control is corrected to the initial set degree $ST_O$ plus the integral correction value TON. It is undesirable for the center of control to change easily, and therefore, the correction gain CG for the calculation of the integral correction value TON must be considerably smaller than the control gain CG for the feedback control.

Referring to FIG. 5, at step 71, it is determined whether the integral correction value TON is larger than a predetermined value l. This value l is predetermined to be a considerably large value, as shown in (B) of FIG. 6, such that this l value is eventually reached after running up a long upward slope. Also, as shown in (B) of FIG. 6, a relatively small value $\alpha$ is predetermined to prevent an overshoot which otherwise occurs when the integral correction value TON is returned quickly. Now, the flow chart in FIG. 5 is described for the time when the automobile is running on the upward slope, with reference to FIG. 6.

The initial correction value TON is zero at the start of the autocruising mode, and may be a small value on a flat road and of the initial stage of an upward slope. Therefore, the result at step 71 is NO. Then, the program goes to step 78 to determine whether the integral correction value TON is smaller than a predetermined value l for the downhill road integration. The result at step 78 is also NO since the assumption is the upward slope integration. Then the program goes to step 79 to determine whether a returning flag F is set to 1. The returning flag F is initialized to zero at the start of the control device and the program goes to step 76 to calculate or select the correction gain CG to a predetermined value $\gamma$ for the calculation of the integral correction value TON and then hold the returning flag F reset to zero at step 77.

Therefore, at the next cycle, the calculation of the integral correction value TON at step 64 in FIG. 4 is carried out by using the correction gain $CG = \gamma$, this value $\gamma$ is relatively small, as previously described, and similar to that in the conventional device. These cycles passing through steps 64, 71, 78, 79, 76, and 77 are repeatedly carried out and the integral correction value TON may be integrated at each cycle to a greater value. Referring to (B) of FIG. 6, the integral correction value TON increases from zero to a greater value and may eventually exceed the predetermined value l.

The result at step 71 in FIG. 5 becomes YES when the integral correction value TON becomes larger than the predetermined value l, and the program goes to step 72. At step 72, it is determined whether the advanced speed SPS is greater than the set speed SPM. If the result is NO and the advanced speed SPS is still smaller than the set speed SPM, the program goes to step 76 to select the value $\gamma$ for the correction gain CG to further increasingly integrate the integral correction value TON thereafter. If the result is YES at step 72, the program goes to step 73 to determine whether the latest speed SPD is greater than the set speed SPM, and then goes to step 76, similar to step 72, if the judgment is NO. A YES result at step 73 means that the relationship between the detected latest speed SPD and the set speed SPM is reversed and the detected latest speed SPD becomes greater than the set speed SPM, and that the automobile has almost reached the top of the slope where the slope levels out or has gone across the top and is on the downward slope. Therefore, it is now necessary to control the throttle valve 12 in the closing direction, by returning or decreasing the integral correction value TON. In this way, if the result is YES at step 73, the program goes to step 74 to select a predetermined value $3\gamma$ for the correction gain CG, which is three times the value $\gamma$ decided at step 76. The program finally goes to step 75 to set the returning flag F to 1. Therefore, from the next cycle, the calculation of the integral correction value TON at step 64 in FIG. 4 is carried out by using the correction gain $CG=3\gamma$.

In summary, the calculation of the integral correction value TON is first carried out to gradually increase the value TON by using the smaller correction gain when the detected (advanced) speed SPS is lower than the set speed SPM, and then the calculation of the integral correction value TON is carried out to quickly return the integrated value by using the greater correction gain $3\gamma$ when the detected (advanced) speed SPS and the latest speed SPD is greater than the set speed BPM. Note, the greater correction gain $3\gamma$ is used when the conditions at steps 71, 72 and 73 are satisfied.

Figure 6:
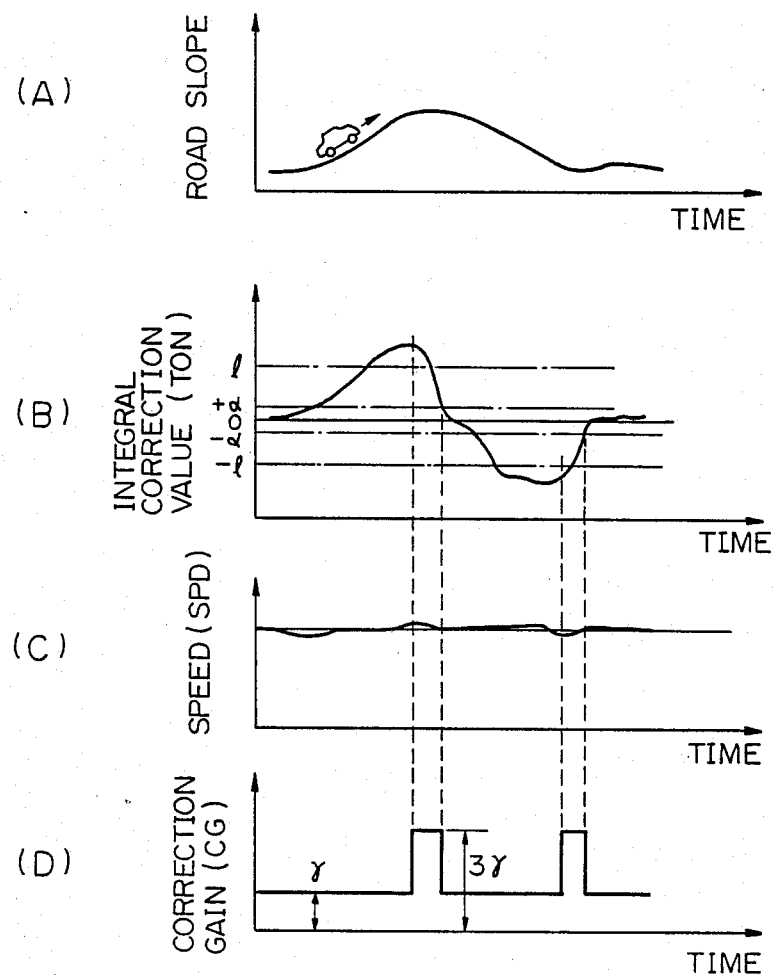
FIG. 6 is a timing chart illustrating the operation of the control device executed by the flow charts of FIGS. 3 to 5.

In this way, the integral correction value TON quickly decreases (refer to FIG. 6), and then the result at step 71 will become NO again. Still, the result at step 78 is NO since the integral correction value TON is returning from the positive integral value and the program goes to step 79 where the result is YES, since the previous cycle has passed through step 75. Then the program goes to step 80 to determine whether the integral correction value TON is greater than the relatively small value $\alpha$, as previously described and exemplified in (B) of FIG. 6. If the result is YES at step 80, the program goes to step 72 and then to steps 74 and 75 to continue the returning integral correction using the greater correction gain $3\gamma$, determining the conditions at steps 72 and 73. The result at steps 72 and 73 may turn at a location where the automobile is not fully descending and the road has turned upward again, for example, after a dip in midhill. The result at steps 72 and 73 may turn to NO at such a location and the program goes to steps 76 and 77 to select the smaller correction gain $\gamma$ to again commence the positive calculation of the integral correction value TON, and thereby the calculation of the returning integral correction using the greater correction gain $3\gamma$ is ended.

Where the calculation of the returning integral correction value TON using the greater correction gain $3\gamma$ continues, the result at step 80 will finally turn to NO. Then the program goes to step 81 to determine whether the integral correction value TON is smaller than $\alpha$ and the result is NO in this case. Thus the program goes to step 76 to change the correction gain CG from $3\gamma$ to $\gamma$ and the returning flag F is reset to 0 at step 77. Thus the calculation of the returning integral correction value TON using the greater correction gain is ended and the program goes from step 79 directly to step 76 from the next cycle. In this way, the integral correction value TON gradually increases, as shown in FIG. 6, and when the thus integrated correction value TON becomes greater than the predetermined value l, it is returned at a relatively quick returning rate to the relatively small value $\alpha$, which is greater than zero and serves to prevent an overshoot of the speed. Note, the correction gain CG in the returning correction is made three times that in the positive integrating calculation in this example, but this is not limited to a triple increase. However, preferably the correction gain CG in the returning correction is made three or four times that in the integration calculation.

FIG. 6 further shows, at righthand half thereof, an example in which the automobile is running on a long downward slope and turns to an upward slope. In this case, the degree of opening of the throttle valve 12 must be first decreased gradually and then returned to increase at a relatively quick returning rate, when the conditions are satisfied, to prevent an undershoot of the speed of the automobile. Steps 78, 81, 82, and 83 are intended to operate in such a downward slope case but a detailed description thereof is omitted here since they have characteristics symmetric to steps 71, 80, 72, and 73. Steps 84 and 85 are identical to step 74 and 75.

Figure 9:
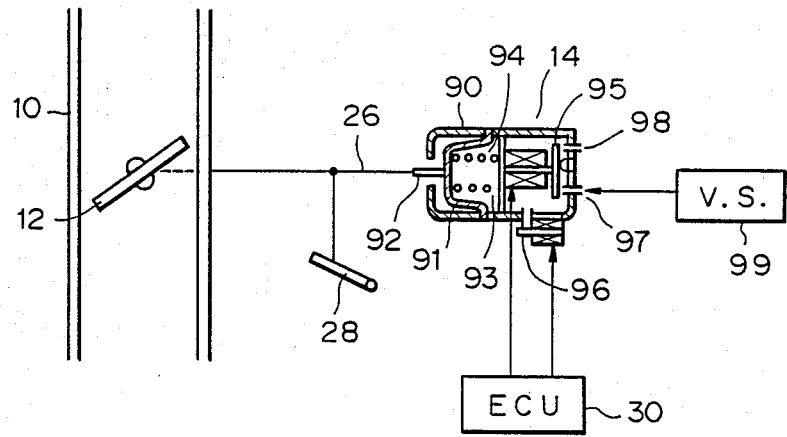
FIG. 9 is a view of a second embodiment of the present invention.

FIG. 9 shows a second embodiment of the present invention which uses a vacuum operated diaphragm actuator 14 in place of the electric step motor in FIG. 2. The vacuum operated diaphragm actuator 14 comprises a housing 90, a diaphragm 91 arranged in the housing 90 and an actuator rod 92 connected to the diaphragm 91. This actuator rod 92 is connected to the throttle valve 12 via the cable 26. A vacuum chamber 93 is formed in the housing 90 on one side of the diaphragm 91, and a spring 94 is arranged in the vacuum chamber 93 to bias the diaphragm 91. A solenoid operated control valve 95 and a solenoid operated release valve 96 are arranged in the housing 90. The release valve 96 is intended merely to introduce the atmospheric pressure into the vacuum chamber 93, and the control valve 95 comprises a vacuum inlet port 97 and an atmospheric pressure inlet port 98 and the valve member engages with these ports 97 and 98 in a selected relationship given by the duty to provide a vacuum in the vacuum chamber 93 under a desired regulated pressure level, and thus the throttle valve 12 can be controlled in proportion to that regulated vacuum. The vacuum inlet port 97 is communicated to a vacuum source 99, which may be a portion of the intake air passage 10 adapted to generate manifold vacuum or a vacuum pump or a combination thereof.

The control valve 95 and the release valve 96 can be controlled by an electric control unit (ECU) 30, similar to that in FIG. 2. The release valve 96 serves mainly when the cancel signal is received, to introduce the atmospheric pressure into the vacuum chamber 93 to stop the automatic control of the throttle valve 12. The control valve 95 controls a degree of opening of the throttle valve 12 under the above described duty control.

Figure 10:
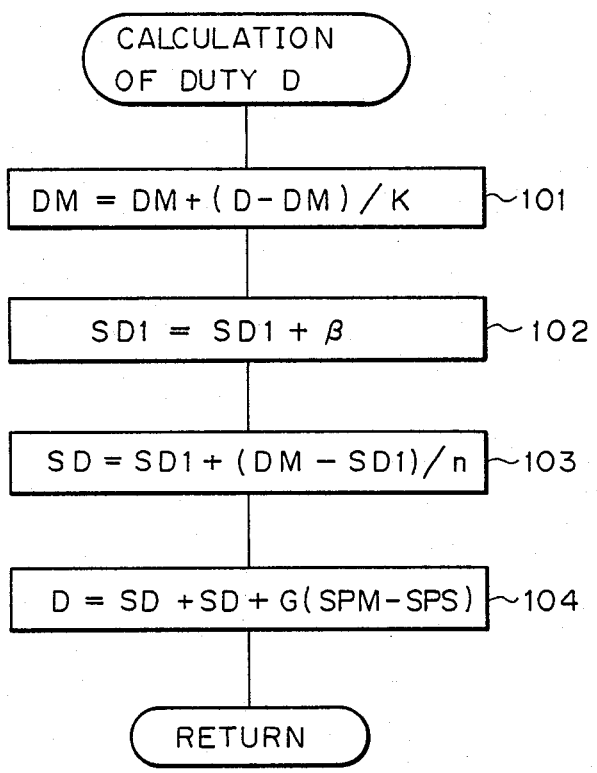
FIG. 10 is a flow chart for executing the control in the second embodiment.

FIG. 10 is a flow chart for calculating a duty D which corresponds to the degree of opening of the throttle valve 12. This program comprises a calculation of a first integral correction element DM at step 101, which is intended to give a quicker response to changes in running conditions, a second integral correction element SD1 at step 102 which is intended to give a relatively slowly response to such changes, and a calculation of a set duty SD at step 103 which may correspond to the calculation of the integral correction value TON in the previous embodiment. Finally, a calculation of a duty D is carried out at step 104, by $D=SD_O+SD+G(SPM-SPS)$, where $SD_O$ corresponds to the initial set degree $ST_O$ in the previous embodiment. This calculation of the duty D corresponds to that at step 66 in FIG. 4. This program is intended to adapt a large integral correction value when the automobile is running on an uneven road such as on the upward slope to increase the response and to adapt a small integral correction value when the automobile is running on an flat road on prevent a variation in the speed of the automobile. To this extent, however, the integral correction value is large when the automobile runs on the upward slope but the integral correction value returns to a lower value at the same rate as of the integration when the automobile goes from the top of the hill to the downward slope.

The first integral correction element DM, quickly responsive to changes, is calculated by DM=DM+(D−DM)/k. Since this calculation includes the output duty D, which is directly related to the change in the speed of the automobile, the first integral correction element DM can quickly respond to changes. The second integral correction element SD1, relatively slow in response to changes, is calculated by SD1=SD1+β. This is similar to the calculation at step 64 in FIG. 4, in which the constant value β is repeatedly integrated in this case, while the integral correction value TON is calculated by integrating the deviation CG(SPM - SPS) in the previous case. Therefore, it is possible to calculate or decide this constant value β, in place of CG, in accordance with the program in FIG. 5, to provide γ for usual integral use and to provide 3γ to quickly return the integrated second integral correction element SD1 when it becomes larger than a predetermined value (for example, l) after a long slope run.

Figure 11:
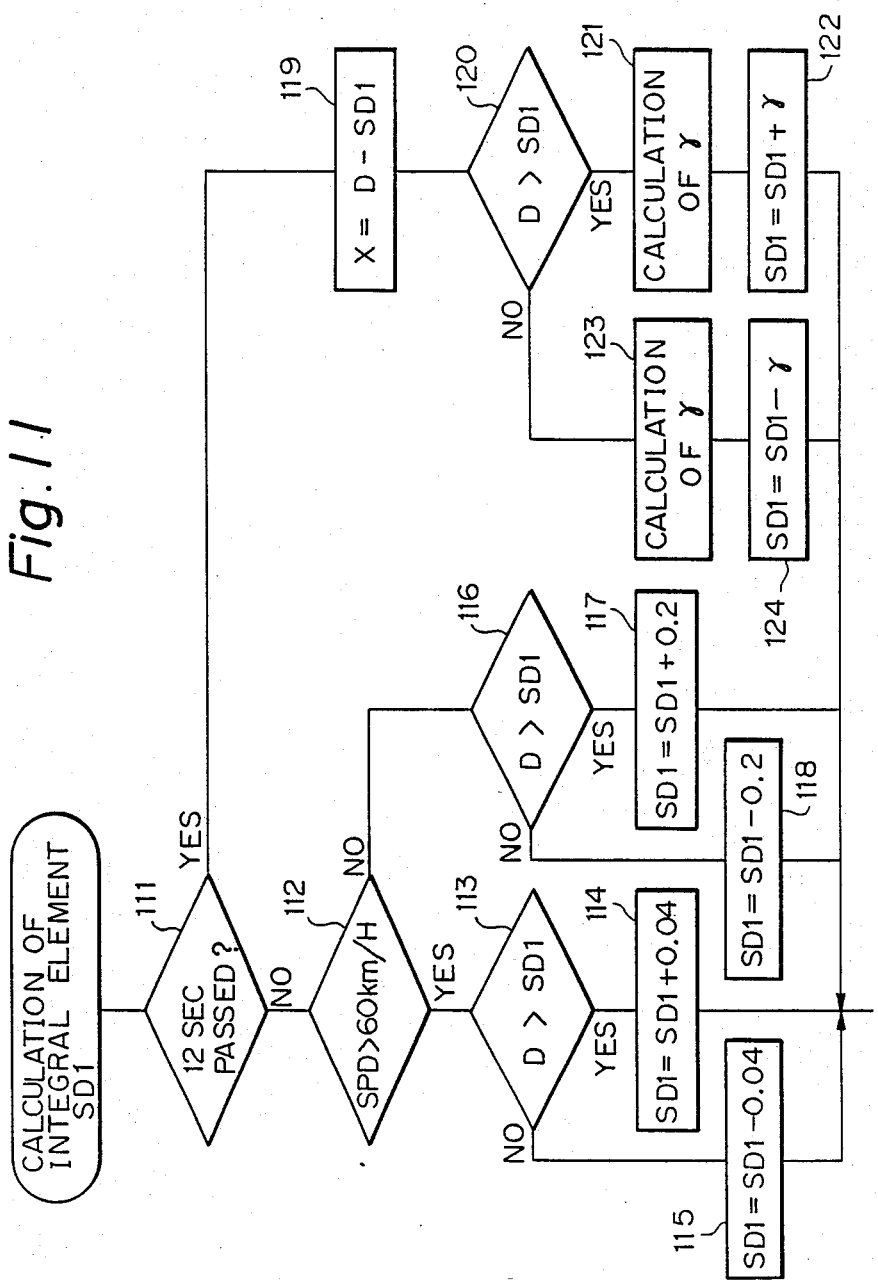
FIG. 11 is a flow chart showing in more detail one of the steps in FIG. 10 for calculating the second integral element.

As described, the value β can be selectively used between γ and 3γ. In FIG. 11, the value β is changed more specifically. At step 11 it is determined whether the twelve seconds has passed from the setting of the autocruising mode. The result is NO until twelve seconds has passed from the setting of the autocruising mode, and the program goes to step 112, at which it is determined if the latest speed SPD is larger than a predetermined value (60 km/H). If the result is YES at step 112, the program goes to step 113 to determine whether the duty D is larger than the second integral element SD1. In this case, it is intended to represent the ascending state of the automobile if the duty d is larger than the second integral element SD1, although the details are omitted. Then, the program goes to step 114 to calculate the second integral element SD1 by SD1=SD1+0.04 (percent/sec), if the result is YES at step 113, and alternately, goes to step 115 to calculate the second integral element SD1 by SD1=SD1−0.04 (percent/sec) if the result is NO. Also, the program will go to step 116 if the result is NO at step 112, to determine whether the duty D is larger than the second integral element SD1, similar to step 113. Then, the program goes to step 117 to calculated the second integral element SD1 by SD1=SD1+0.2 (percent/sec) if the result is YES at step 116, and alternately, goes to step 118 to calculate the second integral element SD1 by SD1=SD1−0.2 (percent/sec) if the result is NO. These calculations are intended to change the correction value in accordance with the (set) speed of the automobile, to increase the response.

The provision of step 111 is based on experience, in which a large correction may not be needed for twelve seconds from the setting of the autocruising mode (no one will set the autocruising mode before going up a hill). Therefore, it is possible to cruise stably with a relatively small correction if the result is NO at step 111. If the result is YES at step 111, the program goes to step 119 to calculate X=D−SD1, and to step 120 to carry out a similar determination to that at step 113, and then goes to step 121 or 123 in accordance with the result at step 120. At step 121, a calculation of γ is carried out and the program goes to step 122 to calculate the second integral element by SD1=SD1+γ. Similarly, a calculation of γ is carried out at step 123 and the program goes to step 124 to calculate the second integral element by SD1=SD1−γ.

Here, it is possible to calculate the value of γ from the following table.

| | | Table of γ | | | |
|---|---|---|---|---|---|
| X | D | >SD1 | D | > | SD1 |
| 0 | ~ | 1 | | 0 (%) | 0 (%) |
| 1 | ~ | 5 | | 0.04 | 0.04 |
| 5 | ~ | 10 | | 0.08 | 0.08 |
| 10 | ~ | 15 | | 0.16 | 0.16 |
| 15 | ~ | 20 | | 0.32 | 1.28 |
| 20 | ~ | | 0.32 | | 4.0 |

In this case too, a further calculation of γ can be carried out in the same way as the calculation of CG, as carried out in accordance with the flow chart in FIG. 5. Therefore, the value of the γ obtained from the above table is directly used in the usual integral correction calculation and the value of the 3γ can be used thereafter to quickly return the integrated second integral correction element SD1 when it becomes larger than a predetermined value (for example, l) after running up a long slope.

As will be clear, it is possible, according to the present invention to quickly return the repeatedly integrated integral correction value during the climbing of a long slope, when it becomes larger than a predetermined value, and the relationship in magnitude between the detected speed and the set speed is reversed.

We claim:

1. A control device for maintaining a constant speed of an automobile, said automobile having an internal combustion engine with an intake air passage and a throttle valve arranged therein, said control device comprising:
   an actuator connected to said throttle valve;
   means for setting a desired set speed of the automobile;
   means for detecting a speed of the automobile;
   throttle deciding means for determining an initial degree of opening of said throttle valve, and controlling said actuator in correspondence with a desired degree of opening of said throttle valve, to bring the speed of the automobile to approach said set speed;
   a first calculating means for determining a difference between the detected speed and the set speed and cyclically obtaining an integral at a predetermined first gain when said difference is a predetermined amount, and calculating an integral correction value and correcting said desired degree of opening of said throttle valve based on said integral correction value when said difference exists; and
   a second calculating means for adjusting said integral correction value toward its initial value at a predetermined second gain greater than said predetermined first gain when said integral correction value calculated by said first calculating means becomes greater than a second predetermined value and the difference between the detected speed and said set speed is no longer the predetermined amount.

2. A control device according to claim 1, wherein said throttle deciding means includes means for providing an initial value for the degree of opening of the throttle valve or a like initial value in correspondence with the degree of opening of the throttle valve when said desired set speed is set, said throttle deciding means determining the degree of opening of the throttle valve by adding said integral correction value TON to said initial value ($ST_o + TON$; $SD_o + SD$).

3. A control device according to claim 2, wherein said integral correction value is obtained by repeatedly integrating a multiplier of a correction gain and a difference between the detected speed and said set speed ($TON = TON + CG(SPM - SPS)$).

4. A control device according to claim 3, wherein a first value ($\gamma$) is selected for said correction gain in said first calculation means and a second value ($3\gamma$) is selected for said correction gain in said second calculation means, wherein said first value being less than said second value.

5. A control device according to claim 4, wherein said second value is less than four times said first value.

6. A control device according to claim 5, wherein said second value is three times said first value.

7. A control device according to claim 2, wherein said integral correction value is obtained by repeatedly integrating a first constant value ($SD1 = SD1 + \beta$) in said first calculating means and said second calculation means uses a second constant value greater than said first value to quickly return the integral correction value toward said initial value.

8. A control device according to claim 2, wherein said integral correction value is obtained by repeatedly integrating a variable value and said second calculation means uses a multiple of said variable value to quickly return the integral correction value.

9. A control device according to claim 1, wherein said actuator comprises an electric step motor.

10. A control device according to claim 1, wherein said actuator comprises a vacuum operated actuator.

11. A control device as in claim 1, wherein said integral, CG, has a value with a value equal to a value of said first gain times said difference wherein said first calculating means includes means for calculating said integral correction value TON by repeatedly summing said integral CG with a previous value of said integral correction value according to $TON \leftarrow TON + CG$.

12. A control device as in claim 11, wherein said second calculating means includes means for subtracting a value larger than said integral using a larger gain than said first gain, from said integral correction value, when said integral correction value is greater than said value and predetermined said difference no longer is said predetermined amount.

13. A control device as in claim 12, wherein said larger value is 3 times gamma.

* * * * *